United States Patent [19]

Suzuki

[11] Patent Number: 5,796,427
[45] Date of Patent: Aug. 18, 1998

[54] IMAGE FLUCTUATION CORRECTION

[75] Inventor: Fuminori Suzuki, Sagamihara, Japan

[73] Assignee: U.S. Philips Corporation, New York, N.Y.

[21] Appl. No.: 574,798

[22] Filed: Dec. 19, 1995

[30] Foreign Application Priority Data

Dec. 28, 1994 [JP] Japan .................. 6-339309

[51] Int. Cl.$^6$ .......................................... H04N 5/232
[52] U.S. Cl. ........................................ 348/208; 348/231
[58] Field of Search ........................ 348/208, 231, 348/207

[56] References Cited

U.S. PATENT DOCUMENTS

| | | | |
|---|---|---|---|
| 4,403,250 | 9/1983 | Kellar | 348/452 |
| 4,901,143 | 2/1990 | Uehara et al. | 348/65 |
| 5,099,323 | 3/1992 | Morimura et al. | 348/208 |
| 5,164,824 | 11/1992 | Ieoka et al. | 348/71 |
| 5,227,889 | 7/1993 | Yoneyama et al. | 348/208 |
| 5,282,044 | 1/1994 | Misawa et al. | 348/208 |
| 5,469,210 | 11/1995 | Noguchi et al. | 348/208 |
| 5,648,815 | 7/1997 | Toba | 348/208 |

FOREIGN PATENT DOCUMENTS

| | | |
|---|---|---|
| 0569709A1 | 11/1993 | European Pat. Off. . |
| WO9406247 | 3/1994 | WIPO . |

*Primary Examiner*—Wendy Garber
*Attorney, Agent, or Firm*—Edward W. Goodman

[57] ABSTRACT

An apparatus for correcting image fluctuation which does not deteriorate quality of an image even when performing compensation of a fluctuation is provided with a first memory 13 for storing an image information Di which represents an image and is generated on the basis of the image signal Sin, a second memory 14 for storing an image information D1 read from the first memory 13, a fluctuation detector 16 for detecting a fluctuation of an image pickup device, a memory controller 17 for controlling writing and reading of the first and second memories 13 and 14, and a rewrite control circuit 18 for identifying a common area contained in the image represented by the image information D1 of the first memory 13 on the basis of an image represented by an image information D2 of the second memory 14 and rewriting the image information of the second memory 14 corresponding to the common area with the image information D1 of the first memory corresponding to the common area, in case that the fluctuation detector 16 has detected a fluctuation.

3 Claims, 2 Drawing Sheets

IMAGE FLUCTUATION CORRECTION

BACKGROUND OF THE INVENTION

1. Field of the Invention

The present invention relates to an apparatus and method for correcting image fluctuation performing compensation to stop a fluctuation of an image caused by, for example, a hand-movement in photographing by means of a video tape recorder with camera in one body. The invention also relates to a camera comprising such an apparatus.

2. Description of the Related Art

In general photographing by means of a video tape recorder with camera in one body (video camera), it is difficult to completely prevent a fluctuation (displacement) of the video camera caused by a hand-movement of a user. The hand-movement causes recording of an unintentionally fluctuated image. In order to prevent such image recording as this, a video camera is equipped with an apparatus for correcting image fluctuation (image stabilizer) for producing an image with no fluctuation by detecting a hand-movement and electrically compensating a fluctuation of the image. An existing image stabilizer is equipped with an analog/digital (A/D) converter, a field memory, a digital/analog (D/A) converter, a fluctuation detector, and a memory controller 6.

The A/D converter converts an image signal of analog form Sin, output from such an image pickup device as a CCD and the like, into an image information of digital form Di to be written into the field memory. The field memory 3 is a RAM or the like having a memory capacity for storing one field's image information, for example. The D/A converter converts an image signal of digital form read from the field memory into, for example, a recording signal of analog form to be recorded onto a magnetic tape. The fluctuation detector is composed of a microprocessor and the like for computing an amount of movement and a direction of movement, namely, an amount of fluctuation and a direction of fluctuation of an image pickup device (video camera) on the basis of a movement signal output from an acceleration sensor and the like. The memory controller is composed of a microprocessor and the like for controlling a point of time and an area for writing into and reading from the field memory.

In the image stabilizer having the above-mentioned composition, when an image signal is input first, an image information is generated by the A/D converter. The memory controller controls writing this image information into the field memory. In case that the image pickup device is not fluctuation, namely, in case that the image pickup device is kept in a fixed position, output of the fluctuation detector is set at an invalid state, since a movement signal is not generated. In this case, for example, in case that a specified amount of image information is written into the field memory, the memory controller continues this writing and, at the same time, performs reading of the image information already completed to write. The image information read from the field memory is converted into a recording signal by the D/A converter and is recorded onto such a recording medium as a magnetic tape and the like. After this, in the same manner, writing into and reading from the field memory are continued.

In case that the prior art image pickup device is in fluctuation, for example, an image information representing a first image and an image information representing a second image are alternately written into the field memory. Such image information as this is generated in case that the image pickup device is fluctuation reciprocally between a position where the first image is taken and another position where the second image is taken.

When such a fluctuation as described above happens to the image pickup device, a movement signal is input into the fluctuation detector. The fluctuation detector generates the information showing an amount of fluctuation and a direction of fluctuation on the basis of the movement signal and notifies the memory controller of it. The memory controller identifies an area common to the first and second images on the basis of this notification. A process of identifying the common area can be performed by, for example, a method of two-dimensionally computing difference between coordinates of the first and second images (X and Y coordinates) by using a function composed of a logic circuit or software in case of controlling the memory area of the field memory as a bitmap.

When the common area is identified, the memory controller reads only an image information representing the common area. In this case, the memory controller is set to have, for example, a long reading period so that a third image may be built by means of only this image information (a less amount of information than usual). After that, the image information is converted into a recording signal by the D/A converter.

In the above-mentioned existing image stabilizer, there has been a problem in the amount of image information for representing an image to be recorded, although compensation of a fluctuation is performed, in case that a fluctuation of an image pickup device, namely, a fluctuation of an image happens. In other words, there has been a problem that quality of an image represented by a recording signal is deteriorated.

SUMMARY OF THE INVENTION

The invention has been made by paying our attention to the above-mentioned point, and an object of the invention is to provide an image stabilizer which does not deteriorate quality of an image even when performing compensation of a fluctuation.

To this end, a first aspect of the invention provides an apparatus for stopping a fluctuation of an image represented by an image signal output from an image pickup device the image fluctuation corresponding to a fluctuation of said image pickup device, which is provided with a first memory for storing image information representing an image and generated on the basis of said image signal, a second memory for storing said image information read from said first memory, a fluctuation detector for detecting a fluctuation of said image pickup device, a memory controller for controlling writing and reading of said first and second memories, and a rewrite control means for identifying a common area contained in an image represented by said image information of said first memory on the basis of an image represented by said image information of said second memory and rewriting the image information of said second memory corresponding to said common area with the image information of said first memory corresponding to said common area, in case that said fluctuation detector has detected a fluctuation.

A second aspect of the invention provides a method of correcting image fluctuation for stopping a fluctuation of an image represented by an image signal output from an image pickup device, the image fluctuation corresponding to the fluctuation of said image pickup device, characterized in that the method comprises the steps of storing image information representing an image and generated on the basis of said image signal into a first memory; storing said image information read from said first memory into a second memory; detecting a fluctuation of said image pickup device; identifying a common area contained in an image represented by said image information of said image on the basis of an image represented by said information of said second memory; and rewriting the image information of said second memory corresponding to said common area with the image information of said first memory corresponding to said common area, in case that a fluctuation has been detected. A third aspect of the invention provides a camera including the above apparatus.

In case that the fluctuation detector has detected a fluctuation of the image pickup device, the rewrite control means is started. The rewrite control means identifies a common area contained in an image represented by the image information stored in the first memory from an image represented by the image information stored in the second memory on the basis of a detection result detected by the fluctuation detector. And the rewrite control means rewrites an image information representing said common area contained in the image information of the second memory with an image information representing said common area contained in the image information of the first memory. Namely, in case that a fluctuation of the image pickup device has been detected, an newly written image information corresponding to the common area and an already stored image information excluding this common area come to be stored in the second memory. In other words, an image information, representing an image represented by combination of the latest image taken by the image pickup device and a past image taken by the image pickup device is read from the second memory.

These and other aspects of the invention will be apparent from and elucidated with reference to the embodiments described hereinafter.

DESCRIPTION OF THE PREFERRED EMBODIMENT

Figure 1:
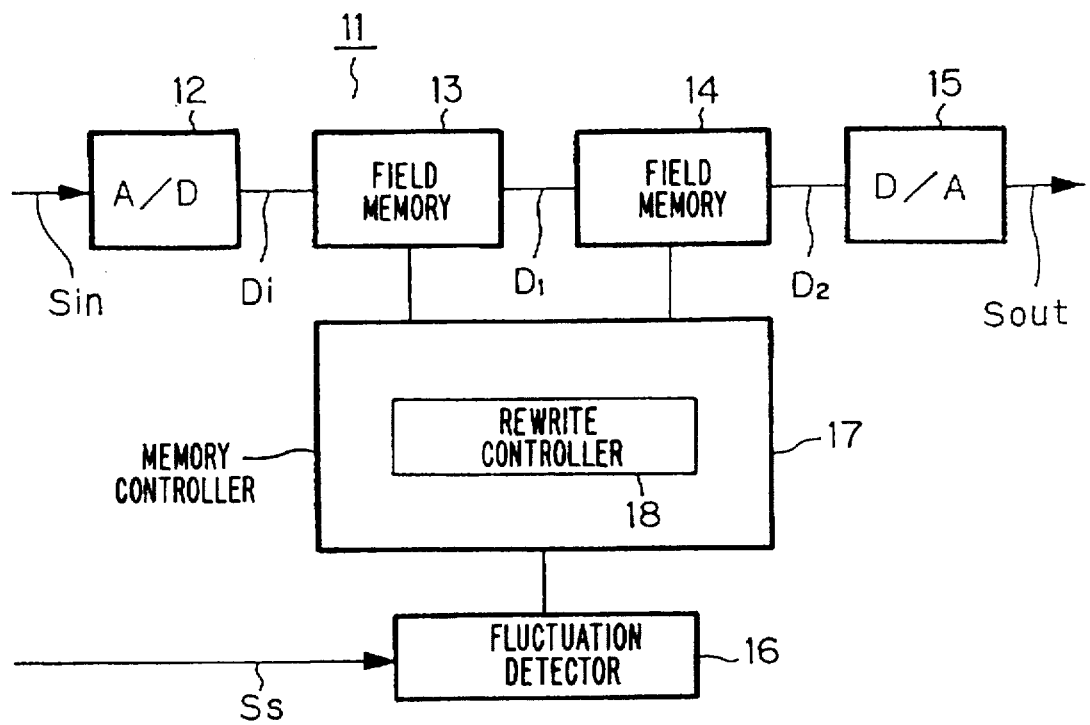
FIG. 1 shows a block diagram of an apparatus for correcting image fluctuation of the invention.

FIG. 1 shows a block diagram of an image stabilizer according to the invention.

The image stabilizer 11 shown in the figure comprises an A/D converter 12, a first and second field memories 13 and 14, a D/A converter 15, a fluctuation detector 16, and a memory controller 17. The A/D converter 12, the D/A converter 15, and the fluctuation detector 16 are the same components as those explained above in FIG. 2.

Each of the first and second field memories 13 and 14 is a memory device composed of, for example, a RAM and the like for storing one field's image information. The memory controller 17 is composed of a microprocessor and the like for controlling a point of time and a position to write into and read from the first and second field memories 13 and 14.

The memory controller 17 is provided with a rewrite control means 18. This rewrite control means 18 is a component provided as one of functions of the memory control means 17 and is composed of software, a logic circuit and the like. The rewrite control means 18 is started in case that the fluctuation detector 16 has detected a fluctuation of the image pickup device, and performs control of rewriting only a part of an image information stored in the second field memory 14 with an image information stored in the first field memory 13.

In the image stabilizer 11 having the above-mentioned composition, when an image signal Si is input first, an image information Di is generated by the A/D converter 12. The memory controller 17 performs control of writing this image information Di into the first field memory 13. In case that the image pickup device is not influctuation, namely, in case that the image pickup device is kept in a fixed position, output of the fluctuation detector 5 is set at an invalid state, since a movement signal Ss is not generated. In this case, when writing, for example, one field's image information into the first field memory 13 is finished, the memory controller 17 starts reading this image information and at the same time writes an image information of a new field into the position where the reading has been performed. The image information read from the first field memory 13 is written into the second field memory. When writing one field's image information into the second field memory is finished, the memory controller 17 starts control of reading an image information D2 from the second field memory 14. This image information D2 is converted into a recording signal out by the D/A converter 4 and is recorded onto such a recording medium as a magnetic tape and the like. After this, in the same manner, writing and reading of the first and second field memories are continued.

Next, action of the image stabilizer 11 in case that the image pickup device is fluctuation is described with reference to FIG. 2.

Figure 2:
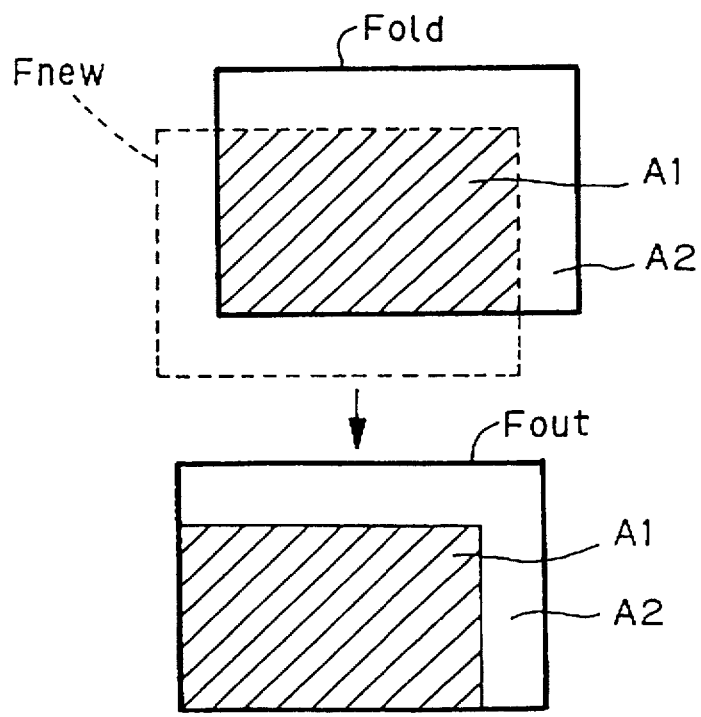
FIG. 2 explains the operation of the apparatus for correcting image fluctuation of the invention.

FIG. 2 is a figure for explaining action of the image stabilizer 11 of the invention.

First, it is assumed that an image information D2 representing a past image Fold is stored in the second field memory 14 and an image information Di representing the present image new is stored in the first field memory 13. In this case, a movement signal Ss showing that there is a fluctuation by which the image pickup device is moved between the position where the image Fold is taken and the position where the image Fnew is taken is input into the fluctuation detector 5. The fluctuation detector 16 generates the information showing an amount and a direction of the fluctuation on the basis of this movement signal Ss, and notifies the memory controller 6 of it. In the memory controller 17 which has recognized this notification, the rewrite control means is started. The rewrite control means 18 identifies an area common to the images Fold and Fnew, namely, a common area A1. A process of identifying the common area A1 can be performed, for example, by a method of two-dimensionally computing difference between coordinates of the images Fold and Fnew (X and Y coordinates) in case of controlling the memory area of the first and second field memories 13 and 14 as a bitmap.

When the common area A1 is identified, the rewrite controller 18 reads an image information D1 for building this common area A1 from the first field memory 13 and writes it into an area where an image information for building the common area A1 on the second field memory 14 was stored. Namely, only an image information for building the common area A1 is rewritten on the second field memory 14.

In this case, the memory controller 6 controls reading of the second field memory 14 in the same manner as in case that the image pickup device is not fluctuation. Therefore, the image information D2 read to build the image Fout when only the common area A1 was rewritten is composed of an image information corresponding to the rewritten common area A1 and an image information corresponding to the area A2 other than the common area A1. Since the image Fout is built with the same amount of information as the images Fold and Fnew, the problem that deterioration of quality of an image is caused by decrease of an image information can be avoided.

An apparatus for correcting image fluctuation in accordance with the invention can prevent occurrence of a problem that compensation of a fluctuation of an image causes reduction of an image information and can always give the same amount of image information as an image information produced on the basis of an image signal output from an image pickup device. Namely, the compensation is not accompanied by deterioration of quality of an image.

Figure 3:
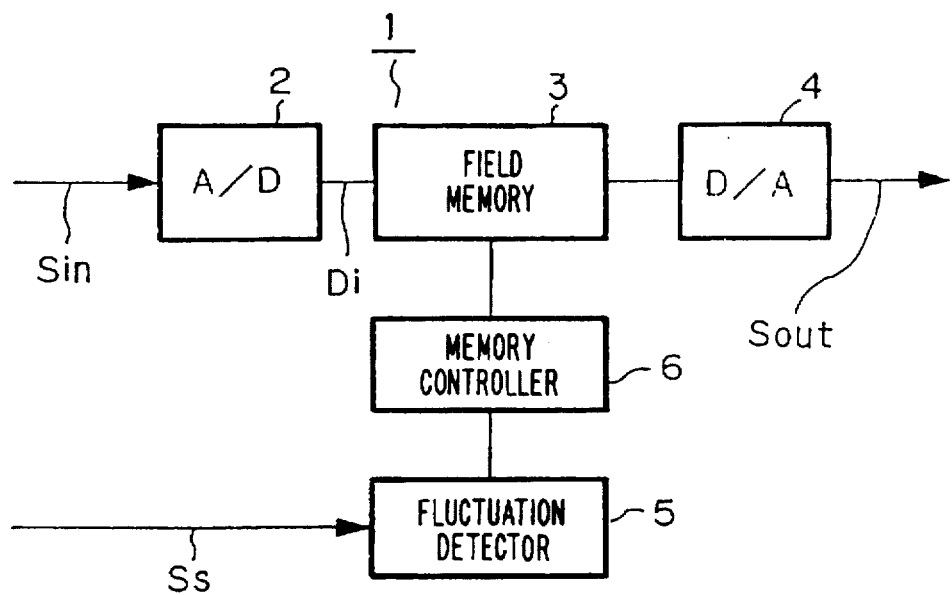
FIG. 3 is a block diagram of a prior art apparatus for correcting image fluctuation.

FIG. 3 shows a block diagram of a prior art image stabilizer.

An image stabilizer 1 shown in the figure is equipped with an analog/digital (A/D) converter 2, a field memory 3, a digital/analog (D/A) converter 4, a fluctuation detector 5, and a memory controller 6.

The A/D converter 2 converts an image signal of analog form Sin output from such an image pickup device as a CCD and the like into an image information of digital form Di to be written into the field memory 3. The field memory 3 is a RAM or the like having a memory capacity for storing one field's image information Di, for example. The D/A converter 4 converts an image signal of digital form Di read from the field memory 3 into, for example, a recording signal of analog form Sout to be recorded onto a magnetic tape. The fluctuation detector 5 is composed of a microprocessor and the like for computing an amount of movement and a direction of movement, namely, an amount of fluctuation and a direction of fluctuation of an image pickup device (video camera) on the basis of a movement signal Ss output from an acceleration sensor and the like. The memory controller 6 is composed of a microprocessor and the like for controlling a point of time and an area for writing into and reading from the field memory 3.

In the image stabilizer 1 having the above-mentioned composition, when an image signal Si is input first, an image information Di is generated by the A/D converter 2. The memory controller 6 controls writing this image information Di into the field memory 3. In case that the image pickup device is not fluctuation, namely, in case that the image pickup device is kept in a fixed position, output of the fluctuation detector 5 is set at an invalid state, since a movement signal Ss is not generated. In this case, for example, in case that a specified amount of image information Di is written into the field memory 3, the memory controller 6 continues this writing and at the same time performs reading of the image information Di already completed to write. The image information Di read from the field memory 3 is converted into a recording signal Sout by the D/A converter 4 and is recorded onto such a recording medium as a magnetic tape and the like. After this, in the same manner, writing into and reading from the field memory are continued.

Figure 4:
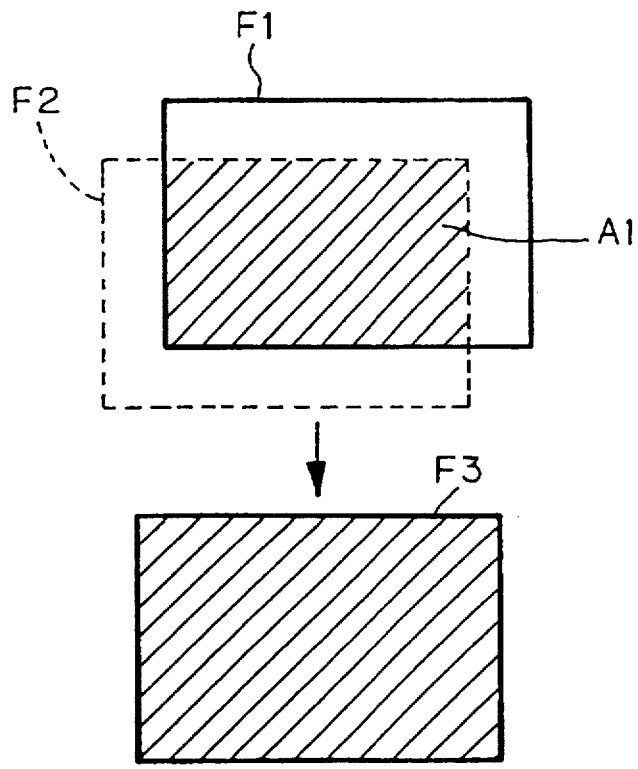
FIG. 4 explains the operation of the prior art apparatus for correcting image fluctuation.

Next, action of the image stabilizer 1 in case that the image pickup device is fluctuation is described as referring to FIG. 4.

FIG. 4 is a figure for explaining action of the prior art image stabilizer 1.

In case that the image pickup device is fluctuation, for example, an image information Di representing a first image F1 and an image information Di representing a second image F2 are alternately written into the field memory 3. Such image information Di as this is generated in case that the image pickup device is fluctuation reciprocally between a position where the image F1 is taken and another position where the image F2 is taken.

When such a fluctuation as described above happens to the image pickup device, a movement signal Ss is input into the fluctuation detector 5. The fluctuation detector 5 generates the information showing an amount of fluctuation and a direction of fluctuation on the basis of the movement signal Ss and notifies the memory controller 6 of it. The memory controller 6 identifies an area A1 common to the images F1 and F2 on the basis of this notification. A process of identifying the common area A1 can be performed by, for example, a method of two-dimensionally computing difference between coordinates of the images F1 and F2 (X and Y coordinates) by using a function composed of a logic circuit or software in case of controlling the memory area of the field memory 3 as a bitmap.

When the common area A1 is identified, the memory controller 6 reads only an image information Di representing the common area A1. In this case, the memory controller 6 is set to have, for example, a long reading period so that an image F3 may be built by means of only this image information Di (a less amount of information than usual). After that, the image information Di is converted into a recording signal sout by the D/A converter 15.

I claim:

1. An apparatus for correcting image fluctuation for stopping a fluctuation of an image represented by an image signal output from an image pickup device, the image fluctuation corresponding to the fluctuation of said image pickup device, characterized by comprising:

a first memory for storing image information representing an image and generated on the basis of said image signal;

a second memory for storing said image information read from said first memory;

a fluctuation detector for detecting a fluctuation of said image pickup device;

a memory controller for controlling writing and reading of said first and second memories; and a rewrite control means for identifying a common area contained in an image represented by said image information of said first memory on the basis of an image represented by said image information of said second memory, and rewriting the image information of said second memory corresponding to said common area with the image information of said first memory corresponding to said common area, in case that said fluctuation detector has detected a fluctuation.

2. A method of correcting image fluctuation for stopping a fluctuation of an image represented by an image signal output from an image pickup device, the image fluctuation corresponding to the fluctuation of said image pickup device, characterized by comprising the steps of:

storing image information representing an image and generated on the basis of said image signal into a first memory;

storing said image information read from said first memory into a second memory;

detecting a fluctuation of said image pickup device;

identifying a common area contained in an image represented by said image information of said first memory on the basis of an image represented by said image information of said second memory; and rewriting the image information of said second memory corresponding to said common area with the image information of said first memory corresponding to said common area, in case that a fluctuation has been detected.

3. A camera comprising an image pickup device and an image fluctuation correcting apparatus as claimed in claim 1.

* * * * *